United States Patent [19]
Li

[11] Patent Number: 4,845,746
[45] Date of Patent: Jul. 4, 1989

[54] ECHO CANCELLER WITH RELATIVE FEEDBACK CONTROL

[75] Inventor: Chan E. Li, Elmhurst, Ill.

[73] Assignee: Rockwell International Corporation, El Segundo, Calif.

[21] Appl. No.: 65,489

[22] Filed: Jun. 23, 1987

[51] Int. Cl.⁴ .............................................. H04B 3/23
[52] U.S. Cl. .................................. 379/411; 379/410; 370/32.1
[58] Field of Search ............... 379/345, 406, 410, 411, 379/344; 370/32, 32.1

[56] References Cited

U.S. PATENT DOCUMENTS 3,922,505  11/1975  Höge .................................... 379/410
4,591,669  5/1986  Duttweiler et al. ............ 370/32.1 X

FOREIGN PATENT DOCUMENTS 2008903  6/1979  United Kingdom ................. 379/410

OTHER PUBLICATIONS

"High Attenuation Digital Echo Suppressor", R. Lenoir, IBM Technical Disclosure Bulletin, vol. 20, No. 4, Sep. 1977.

Primary Examiner—Jin F. Ng
Assistant Examiner—Randall S. Vaas
Attorney, Agent, or Firm—C. B. Patti; V. L. Sewell; H. F. Hamann

[57] ABSTRACT

A method for selecting feedback constants for two echo cancellers in an adaptive 2-wire to 2-wire repeater. The repeater is connected to two networks and when signals are received from both networks, the signal having the greater energy level is identified. A feedback constant of the echo canceller associated with the greater signal is set independent of the feedback constant of the other echo canceller. The feedback constant of the other echo canceller is set as a function of a ratio of the signal energy level of a lesser of to larger of the two signals received from the networks.

4 Claims, 2 Drawing Sheets

FIG. I

ECHO CANCELLER WITH RELATIVE FEEDBACK CONTROL

BACKGROUND OF THE INVENTION

This invention relates in general to adaptive 2-wire to 2-wire repeaters and, in particular, to a repeater employing two digital echo cancellers.

In general, echo cancellers are well known in the prior art and are utilized in both 2-wire to 2-wire repeaters, as well as, 2-wire to 4-wire conversion circuits. These type of circuits are also referred to as hybrids.

In general terms, proper impedance balancing of the hybrid with communication networks to which it is attached, will result in an information signal supplied through the communication network passing through the hybrid without any ill effect. In the case where the impedance is not completely balanced, information signals may pass through the hybrid and be sent back to a calling subscriber, causing the phenomena commonly referred to as "echo". Although the echo produced in a comparatively short distance network does not cause much disturbance in conversation, the echo produced in a long distance communication network appreciably effects the quality and performance of the conversation. Furthermore, echo can be a detrimental influence in data communication signals.

Echo suppression and cancellation circuits is typically used to eliminate the echo which may occur in the hybrid. In the case of a conventional echo suppressor the calling subscriber signal is detected with a threshold level higher than the echo level by approximately 9 dB on the average. Although the reduction in echo is attained, however, voice clipping also occurs and thereby reduces the conversation quality.

Prior art digital circuits which use two echo cancellers, typically treat the two echo cancellers independently. Each echo canceller uses a feedback constant based on its received energy to control its own rate of adaption. It also uses a near-end speech detector to inhibit adaption during double talk. This prevents the adaption of these echo cancellers for full duplex voice band data transmission because double talk will be detected at all times.

The present invention provides an echo cancellation method which is an improvement over prior art echo suppressors and cancellation circuits.

SUMMARY OF THE INVENTION

The present invention involves a method for controlling the adaption of two echo cancellers in a 2-wire to 2-wire hybrid to achieve maximum return loss and allow voice band full duplex data transmission. In accordance with the present invention, the near-end speech detector is disabled to allow adaption during double talk. The ratio of the received signal energy of the two echo cancellers is used to determine the relative rate of adaption. The adaption speed of the echo canceller with stronger received signals is determined independently. Then the adaption speed of the other echo canceller is reduced by the ratio of the relative signal energies.

BRIEF DESCRIPTION OF THE DRAWINGS

The features of the present invention which are believed to be novel, are set forth with particularly in the appended claims. The invention, together with further objects and advantages, may best be understood by reference to the following description taken in conjunction with the accompanying drawings, and in which:

DESCRIPTION OF THE PREFERRED EMBODIMENT

The present invention has general applicability, but is most advantageously utilized in an adaptive 2-wire to 2-wire repeater employing two digital echo cancellers to maximize the return loss for both the first echo canceller and the second echo canceller.

Figure 1:
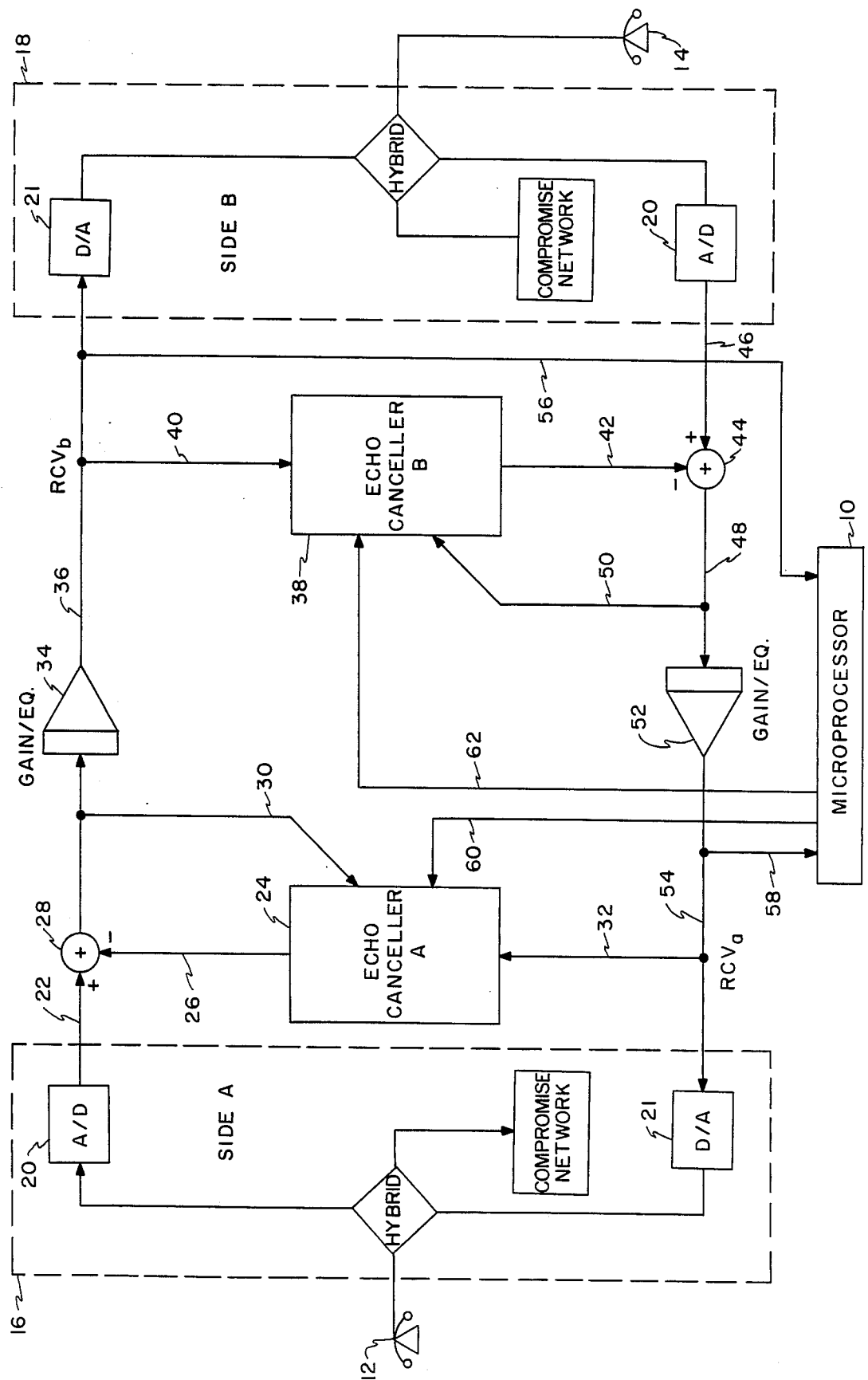
FIG. 1 is a block diagram of an adaptive 2-wire to 2-wire repeater having two echo cancellers operated according to the method of the present invention.

FIG. 1 illustrates a general block diagram of the 2-wire to 2-wire repeater which has echo cancellers A and B. Such an adaptive 2-wire to 2-wire repeater may be, for example, a Model No. 6122-56 supplied by Rockwell International and modified appropriately to interface with the microprocessor 10, as shown in FIG. 1. In the preferred embodiment, the microprocessor 10 is a digital signal processing chip which may be either a 7720 supplied by N.E.C. or a TMS 32010 supplied by Texas Instrument. The programming of the microprocessor chip may include many different features for controlling the repeater shown in FIG. 1, however, in terms of the method of the present invention, a portion of the programming would be according to the flowchart depicted in FIG. 2.

Referring now to FIG. 1, a first communication network 12 is connected to a side A of the repeater and a second communication network 14 is connected to a side B of the repeater. In the preferred embodiment, it would be assumed that signal transmissions can be received from network 12 or from network 14 or can be received simultaneously from both networks 12 and 14. Appropriate interface circuitry 16, as is well known in the art, is connected to the network 12 and a similar interface circuitry 18 is connected to the network 14. The interface circuits 16 and 18 have appropriate analog/digital converters 20 for converting the signals on the networks 12 and 14 to digital form for use by the summing junction 28 and 44.

The interface circuits 16 and 18 have appropriate digital to analog converters 21 for converting the signal on lines 54 and 36 to analog form for use by the hybrid.

A signal received from network 12 will appear on line 22 from the interface circuit 16. The A echo canceller 24 supplies its signal on line 26 to the summing junction 28. Line 30 supplies an error signal to the A echo canceller 24. The A echo canceller 24 receives its input signal on line 32, as is shown in FIG. 1. A signal from the summing junction 28 is processed by a gain and equalizer stage 34, the output of which is a signal RCVb on line 36. Similarly, B echo canceller 38 receives its input signal on line 40, which is the signal RCVb, and outputs its signal on line 42 to a summing junction 44, which receives its signal on line 46. The signal on line 46 is the signal received from the network 14 by the interface circuit 18. The output of the summing junction appears on line 48 and the error signal for the B echo canceller 38 is on line 50. Another gain and equalizer stage 52 receives the output of the summing junction 44 on line 48 and outputs a signal, RCVa on line 54. The signal RCVa is the signal received by the A echo canceller 24 on line 32. Also, the signal RCVb is the signal supplied to the network 14 and the signal RCVa is the signal supplied to the network 12.

The microprocessor 10 receives the signals RCVa and RCVb on lines 58 and 56 and outputs control signals on lines 60 and 62 to the A echo canceller 24 and the B echo canceller 38, respectively. The control signals set the feedback constants of the echo cancellers.

The operation of the method of the present invention will now be described with reference to the flowchart shown in FIG. 2. It is to be understood that in the preferred embodiment the present invention is particularly advantageously utilized when the repeater, as shown in FIG. 1, receives data transmissions simultaneously from the networks 12 and 14. However, it is to be appreciated that the present invention operates equally well when a data transmission is received from only one of the networks 12 or 14 and also for the case of voice transmissions on the networks 12 and 14.

Figure 2:
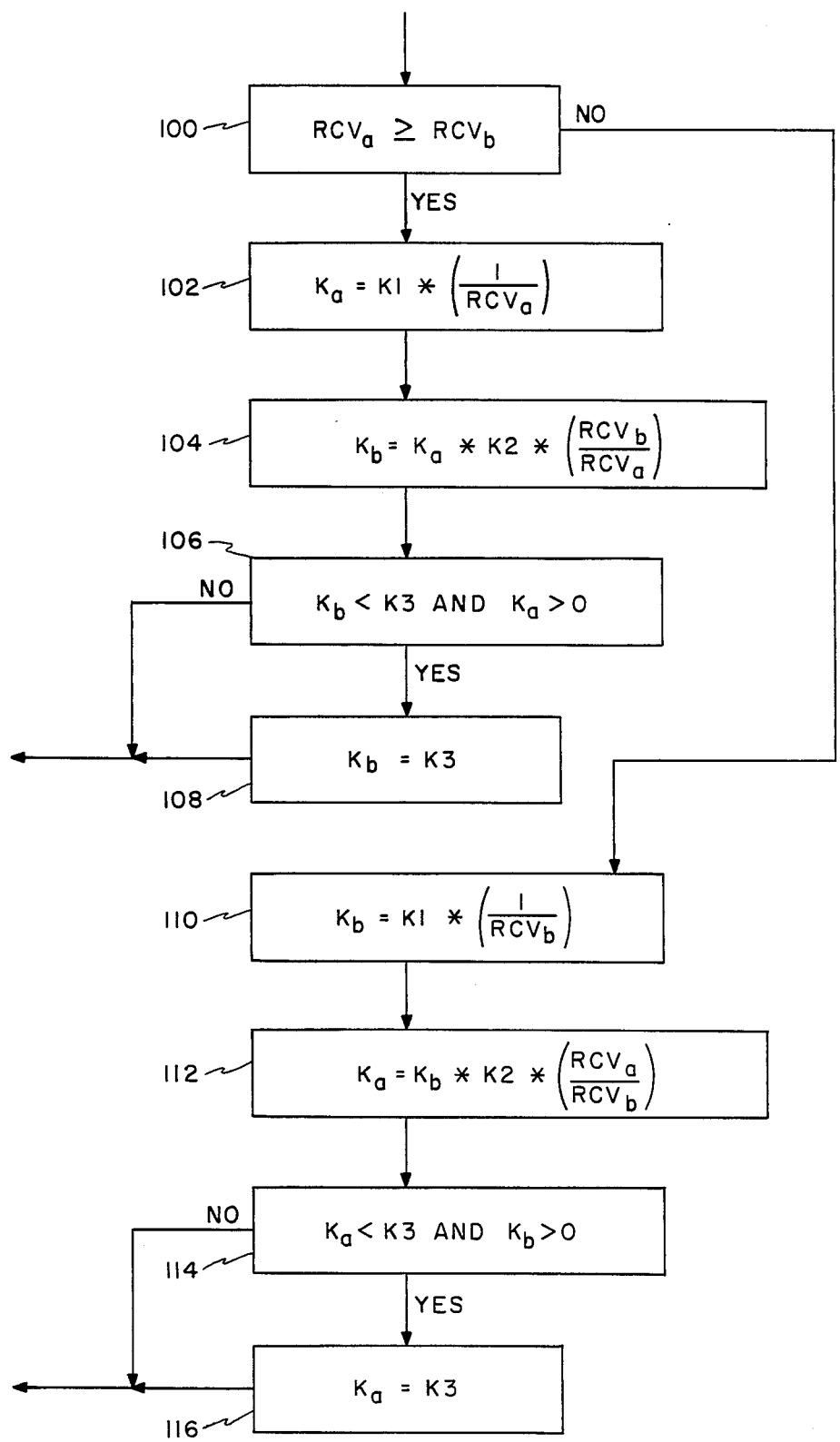
FIG. 2 is a flowchart depicting the steps in the method of the present invention utilized in FIG. 1.

Referring now to FIG. 2, the microprocessor 10 according to its programming determines the energy level of the signal RCVa (hereinafter referred to as energy (RVCa)) and the energy level of the signal RCVb (hereinafter referred to as energy (RVCb)) and compares these two energies to determine if the energy (RCVa) is greater than or equal to the energy (RCVb). This is depicted as step 100 in FIG. 2. If the energy (RCVa) is greater than the energy (RCVb) then the feedback constant, Ka for the A echo canceller is set equal to a first predetermined constant K1 times the inverse of the energy (RCVa), as shown in block 102.

The feedback constant, Kb for the B echo canceller is set equal to the feedback constant Ka times a second predetermined constant K2 times the ratio of the energy (RCVb) to the energy (RCVa), as shown in step 104.

If the feedback constant Kb is less than a third predetermined constant K3 and if the feedback constant Ka is greater than zero then the feedback constant Kb is set equal to a third predetermined constant K3, as shown in steps 106 and 108. This provides a minimum value for the feedback constant Kb. The operation of the microprocessor then continues its other operations, the appropriate feedback constants for the A and B echo cancellers having been set for the data signals arriving from networks 12 and 14.

In the case where the energy (RCVa) is less than the energy (RCVb) then the feedback constant Kb is set equal to K1 times the inverse of the energy (RCVb), see block 110, and the feedback constant Ka is set equal to the feedback constant Kb times K2 times the ratio of the energy (RCVa) to the energy (RCVb), see block 112.

If the feedback constant Ka is less than the third predetermined constant K3 and if the feedback constant Kb is greater than zero, than the feedback constant Ka is set equal to K3, thereby determining a minimum value for the feedback constant Ka, see blocks 114 and 116.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A method for selecting feedback constants for at least first and second echo cancellers in a 2-wire to 2-wire repeater connected between first and second networks, said repeater processing a first signal received from the first network to produce a RCVb signal and processing a second signal received from the second network to produce a RCVa signal, comprising:

comparing an energy level of said RCVa signal (energy (RVCa)) to an energy level of said RCVb signal (energy (RCVb)) and if said energy level of said RCVa signal is greater than or equal to the energy level of said RCVb signal, then;

setting a feedback constant, Ka, of the first echo canceller to $K1 \times (1/\text{energy (RCVa)})$, where K1 is a first predetermined constant; and setting a feedback constant, Kb, of the second echo canceller to $Kb = Ka \times K2 \times (\text{energy (RCVb)}/\text{energy (RCVa)})$, where K2 is a second predetermined constant.

2. The method described in claim 1, wherein said method further comprises, if said feedback constant, Kb, is less than a third predetermined constant, K3, and if the feedback constant, Ka, is greater than zero, setting the feedback constant, Kb, equal to the third predetermined constant, K3.

3. The method described in claim 1, wherein if said energy level of said RCVa signal is less than said energy level of said RCVb signal, then said method further comprises;

setting said feedback constant, Kb, of the second echo canceller to $K1 \times (1/\text{energy (RCVb)})$; and setting said feedback constant, Ka, of the first echo canceller to $Kb \times K2 \times (\text{energy (RCVa)}/\text{energy (RCVb)})$.

4. The method described in claim 3, wherein said method further comprises, if said feedback constant, Ka, is less than said third predetermined constant, K3, and if the feedback constant, Kb, is greater than zero, setting the feedback constant, Ka, equal to said third predetermined constant, K3.

* * * * *